US008758496B2

(12) United States Patent
Beck et al.

(10) Patent No.: US 8,758,496 B2
(45) Date of Patent: Jun. 24, 2014

(54) REDISPERSIBLE DRIED NANOCRYSTALLINE CELLULOSE

(75) Inventors: Stephanie Beck, Montreal (CA); Jean Bouchard, Montreal (CA); Richard Berry, Notre-Dame-de-L'Ile-Perrot (CA); Joseph Donat Louis Godbout, Montreal (CA)

(73) Assignee: FPinnovations, Pointe-Claire, Quebec (CA)

( * ) Notice: Subject to any disclaimer, the term of this patent is extended or adjusted under 35 U.S.C. 154(b) by 419 days.

(21) Appl. No.: 13/139,026

(22) PCT Filed: Dec. 8, 2009

(86) PCT No.: PCT/CA2009/001787
§ 371 (c)(1),
(2), (4) Date: Aug. 10, 2011

(87) PCT Pub. No.: WO2010/066036
PCT Pub. Date: Jun. 17, 2010

(65) Prior Publication Data
US 2011/0290149 A1 Dec. 1, 2011

Related U.S. Application Data

(60) Provisional application No. 61/193,620, filed on Dec. 11, 2008.

(51) Int. Cl.
*C09D 101/02* (2006.01)
(52) U.S. Cl.
USPC .................................................. 106/163.01
(58) Field of Classification Search
None
See application file for complete search history.

(56) References Cited

U.S. PATENT DOCUMENTS 5,629,055 A  5/1997 Revol et al.

OTHER PUBLICATIONS

Viet et al, dispersion of cellulose nanocrystals in polar organic solvents, 2007, cellulose pp. 109-113.*
Samir, Azizi, M.A.S., Alloin, F. & Dufresne, A. Biomacromolecules 6, 612 (2005).
de Souza Lima, M.M. & Borsali, R. Macromol. Rapid Comm. 25, 771 (2004).
Revol, J.-F., Bradford, H., Giasson, J., Marchessault, R.H. & Gray, D.G. Int. J. Biol. Macromol. 14, 170 (1992).
Revol, J.-F., Godbout, L., Dong, X.M., Gray, D.G., Chanzy, H. & Maret, G. Liquid Crystals 16, 127 (1994).
Marchessault, R.H., Morehead, F.F. & Koch, M.J. J. Colloid Sci. 16, 327 (1961).
Dong, X.M., Revol, J.-F. & Gray, D.G. Cellulose 5, 19 (1998).
Ranby, B.G. Discuss. Faraday Soc. 11, 158 (1951).

(Continued)

*Primary Examiner* — Melvin C Mayes
*Assistant Examiner* — Stefanie Cohen
(74) *Attorney, Agent, or Firm* — Norton Rose Fulbright Canada LLP

(57) ABSTRACT

Dried forms of nanocrystalline cellulose (NCC) with controllable redispersibility in water are provided; lightweight and easily transportable dried acid-form nanocrystalline cellulose which can be resuspended for use in a desired application can be produced by maintaining the humidity content of the NCC within a specific, low, range; evaporated acid-form NCC suspensions with moisture contents below this range are non-dispersible and therefore can be subsequently fixed in permanently dried form; the second form is produced by exchanging the proton of the acid-form NCC for neutral monovalent counterions and freeze-drying the NCC to give a solid product which rapidly disperses when placed in water; properties similar to those of the original suspension are also obtained with a brief sonication treatment.

15 Claims, 2 Drawing Sheets

(56) References Cited

OTHER PUBLICATIONS

Araki, J., Wada, M., Kuga, S. & Okano, T. Colloids Surf., A 142, 75 (1998).
Araki, J., Wada, M., Kuga, S. & Okano, T. J. Wood Sci. 45, 258 (1999).
Dong, X.M. & Gray, D.G. Langmuir 13, 2404 (1997).
Viet, D., Beck-Candanedo, S. & Gray, D.G. Cellulose 14, 109 (2007), and references therein.
Heux, L., Chauve, G. & Bonini, C. Langmuir 16, 8210 (2000).
Turbak, A.F., Snyder, F.W. & Sandberg, K.R. J. Appl. Poly. Sci.: Appl. Poly. Sympos. 37, 815 (1983).
Gousse, C., Chanzy, H., Excoffier, G., Soubeyrand, L. & Fleury, E. Polymer 43, 2645 (2002).
Grunert, M. & Winter, W.T. J. Poly. Environ. 10, 27 (2002).
Araki, J., Wada, M. & Kuga, S. Langmuir 17, 21 (2001).
Samir, M.A.S.A., Alloin, F., Sanchez, J.-Y., El Kissi, N., & Dufresne, A. Macromolecules 37, 1386 (2004).
Lefebvre, J.; Gray, D.G. Cellulose 12, 127 (2005).
Edgar, C.D.; Gray, D.G. Cellulose 10, 299 (2003).
Mihranyan, A.; Llagostera, A.P.; Karmhagc, R.; Strømmec, M.; Eka, R. Int. J. Pharm. 269, 433 (2004).
Kocherbitov, V.; Ulvenlund, S.; Kober, M.; Jarring, K.; Arnebrant, T. J. Phys. Chem. B 112, 3728, (2008).
Browning, B.L. The Chemistry of Wood New York: Wiley, 1963.
Lide, David R., ed., CRC Handbook of Chemistry and Physics, 85th ed. Boca Raton: CRC Press, 2004.
Orts, W.J., Godbout, L., Marchessault, R.H., and Revol, J.F., Shear-Induced Alignment of Liquid-Crystalline Suspensions of Cellulose Microfibrils, 1995, 334.
Orts, W.J., Godbout, L., Marchessault, R.H., and Revol, J.F., Enhanced Ordering of Liquid Crystalline Suspensions of Cellulose Microfibrils, Macromolecules 1998, 31, 5717-5725.

* cited by examiner

REDISPERSIBLE DRIED NANOCRYSTALLINE CELLULOSE

CROSS-REFERENCE TO RELATED APPLICATIONS

This application is a National entry of PCT/CA2009/001787 filed Dec. 8, 2009, in which the United States of America was designated and elected, and which remains pending in the International phase until Jun. 11, 2011, which application in turn claims priority under 35 USC 119(e) from U.S. Provisional application Ser. No. 61/193,620 filed Dec. 11, 2008.

TECHNICAL FIELD

This invention relates to the dispersion properties of nanocrystalline cellulose (NCC) produced by acid hydrolysis of cellulose. In particular, it relates to the dispersion in water of NCC which has been dried by evaporation or freeze-drying. Dried NCC, for example air-dried NCC, with hydronium counterions, having specific low moisture contents, gives an aqueous suspension with properties similar to those of the original. NCC that has had its acidic hydronium counterion exchanged for a neutral monovalent cation and then freeze-dried from aqueous suspension also gives a suspension with properties similar to those of the original.

BACKGROUND ART

Nanocrystalline cellulose is produced by the controlled acid hydrolysis of cellulose sources such as bleached wood pulp [1-4]. The use of sulfuric acid imparts negatively charged, acidic sulfate ester groups at the NCC surface, resulting in stable aqueous suspensions due to electrostatic repulsion between the colloidal NCC particles [3, 5-10].

NCC is a renewable, recyclable, carbon neutral material. These factors and potentially unique mechanical and optical properties of NCC have generated great interest in manufacturing NCC-based products at an industrial scale. However, because NCC is initially produced as an aqueous suspension with only a few weight percent solids content, any high-volume application will require NCC to be delivered in dried form and resuspended at the site of use in order to minimise both cost and shipment size and weight. Drying NCC also provides another benefit by preventing bacterial and fungal growth, to which aqueous NCC suspensions are susceptible when stored for long periods, even at 4° C.

Drying is also a necessary step in the removal of water from NCC suspensions for solvent exchange prior to redispersing NCC in organic solvents [12-13] for chemical modification, and in polymers for nanocomposites manufacture [1]. Freeze-drying is generally used to accomplish this. Often, additives and chemical surface modification have been used to aid in the redispersion of NCC particles in organic solvents. Microfibrillated cellulose produced without chemical modification has been dispersed in polar solvents such as glycerine, poly(ethylene glycol) and DMSO [14]. Stable suspensions of cellulose whiskers (crystalline cellulose similar to NCC but microns in length) prepared from marine invertebrates have been obtained in toluene and cyclohexane using a phosphoric ester surfactant [13]. Partial surface silylation has also been used to disperse NCC in nonpolar organic solvents [15] and acetone [16]. Finally, grafting low molecular weight poly(ethylene glycol) onto the surface of cellulose nanocrystals has been found to yield stable suspensions in chloroform [17].

Several attempts to redisperse freeze-dried cellulose whiskers and NCC in polar organic solvents such as DMF and DMSO without surfactants or chemical modification have been successful [12,18]. Dilute suspensions were prepared by vigorous mixing and intensive ultrasonication of the dried cellulose nanocrystals in the organic solvents.

Nanocrystalline cellulose suspensions produced by sulfuric acid hydrolysis are not dispersible in water once they have been fully dried to solid films, even under fairly gentle drying conditions, for example in a vacuum oven at 35° C. for 24 hours [11]. It is thought that the proton counterions contributed by the acid and associated with the sulfate groups imparted to the NCC during hydrolysis are responsible for strengthening the intermolecular hydrogen bonding between the cellulose crystallites and causing the NCC film's non-redispersibility [11]. The proton counterions can be exchanged for other monovalent counterions; dried NCC with, e.g., sodium counterions was found to be completely redispersible in water [11]. Based on FT-IR spectra of acid-form (H-NCC) and sodium-form (Na-NCC) NCC films, it has been suggested that extra intermolecular hydrogen bonding between cellulose nanocrystals in the H-NCC film may prevent its redispersion in water [11].

It is, however, known that freshly cast free-standing H-NCC films or thin H-NCC films spun onto solid substrates will swell and disperse in water with slight agitation [8,19, 20]. The moisture content of these films was not determined. There is no prior art (journal articles, patents, etc.) regarding the effect of moisture content or humidity on the dispersibility of dried NCC suspensions.

Cellulose is a hygroscopic material and will absorb moisture from the surrounding air; it has been found from moisture sorption isotherms that cellulose samples of differing crystallinity will absorb different quantities of moisture, higher crystallinity resulting in lower final moisture contents [21]. Sorption calorimetry studies on microcrystalline cellulose (MCC), ball-milled cellulose (of lower crystallinity) and cellulose recrystallized after ball-milling have also found that the most crystalline sample (MCC) showed the lowest water uptake [22]. The authors suggested that in addition to adsorbing at the cellulose-air interfaces, near-monolayers of water molecules adsorbed between the solid interfaces of cellulose microfibrils in the MCC powder, followed by additional layers. As NCC films can be described as having an "open structure" not dissimilar to that of MCC powder, containing ordered crystalline elements with spaces between them, adsorption of water molecules between the nanocrystal surfaces may partially explain the mechanism of the effect of moisture content on their dispersibility (see FIG. 1). FIG. 1 (based on Figures in [21] and [22]) shows a schematic diagram of water molecules B adsorbing on cellulose surfaces; the rectangular rods A can represent microfibrils in the case of MCC, or individual cellulose nanocrystals in the case of solid NCC films. Highly crystalline but non-porous algal cellulose extracted by HCl hydrolysis of green algae has been found to exhibit greater $N_2$ adsorption than $H_2O$ adsorption, in contrast to porous cellulose powders with crystalline elements, which displayed much greater $H_2O$ than $N_2$ adsorption, suggesting that water adsorbs between the solid surfaces (e.g., microfibrils) of the porous cellulose [21]. It has been found previously that water adsorbs onto the crystalline surfaces of cellulose [23].

Previous studies of the dispersibility of dried H-NCC have been confined to its dispersibility in organic solvents and polymers for chemical surface modification and nanocomposites [1,12]. H-NCC can also be easily converted to a more "permanent" non-dispersible form if so desired, using a simple drying step. In addition, lower chemical costs and minimal manipulation required make dispersible dried H-NCC an attractive option.

When the proton counterion is exchanged for a variety of monovalent cationic counterions, including $Na^+$, $K^+$, $Li^+$, $NH_4^+$ and tetraalkylammonium ($R_4N^+$), protonated trialkylammonium ($HR_3N^+$), protonated dialkylammonium ($H_2R_2N^+$), and protonated monoalkylammonium ($H_3RN^+$) ions, the air-dried solid NCC films produced from these suspensions are completely redispersible in water [11]. After brief sonication, the resulting colloidal NCC suspensions were found to have properties similar to those of the native suspensions [11]. These suspensions underwent phase separation to give two phases within several hours of standing, which is an indication of a well-dispersed suspension. The neutral forms of NCC such as Na-NCC possess an advantage over the acidic H-NCC: The freeze-drying process causes almost immediate partial desulfation of H-NCC (removal of the anionic sulfate ester groups which contribute to NCC suspension stability); this process continues during storage of the freeze-dried H-NCC, accompanied by degradation of the is cellulose chains. Neutral Na-NCC does not undergo this degradation when freeze-dried.

DISCLOSURE OF THE INVENTION

This invention seeks to provide a water-dispersible dried solid form of H-NCC. This may be a film, powder, flake, foam or other form.

This invention also seeks to provide a process for producing a water-dispersible H-NCC dried solid form.

Further, the invention seeks to provide a water-dispersible solid form of a freeze-dried NCC, in which protons of H-NCC are replaced by a monovalent cation.

Still further this invention seeks to provide a process for producing the aforementioned freeze-dried solid form.

This invention also seeks to provide a method for casting a solid NCC film.

In accordance with one aspect of the invention, there is provided a water-dispersible H-NCC dried solid form having an initial moisture content of at least 4% by weight.

In accordance with another aspect of the invention, there is provided a process for producing a water-dispersible H-NCC solid film comprising evaporating water from a film layer of an aqueous suspension of H-NCC to a moisture content of at least 4% by weight.

In accordance with yet another aspect of the invention, there is provided a water-dispersible solid form comprising a freeze-dried NCC in which protons have been replaced by a monovalent cation.

In accordance with yet another aspect of the invention, there is provided a process for producing a water dispersible dried solid form comprising: exchanging protons of H-NCC in an aqueous suspension with a monovalent cation; forming a film layer of the resulting M-NCC suspension in which M is a monovalent cation; and drying the film layer to form said solid form.

In still another aspect of the invention there is provided a solid lyophilized M-NCC, wherein M is a monovalent cation.

In particular the solid lyophilized M-NCC is in a non-film form, for example a particulate or flake form.

The monovalent cation M is, more especially, a cation other than $H^+$.

In still another aspect of the invention, there is provided a method of casting a solid NCC film comprising dispersing a water dispersible dried solid form of the invention in an aqueous medium to form an aqueous suspension of NCC, casting a film layer of said suspension, and drying the film layer to said solid film.

The water-dispersible dried solid form of H-NCC may be, for example, a film, powder, flake, grain, particulate, foam or other solid form.

DETAILED DESCRIPTION OF THE INVENTION

Figure 1A:
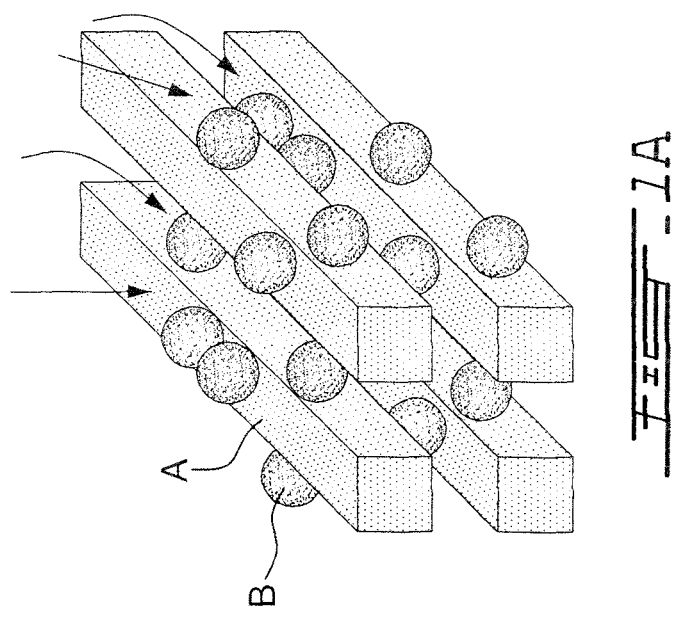
FIG. 1A is a schematic diagram in a perspective view of water adsorbing onto cellulose surfaces such as microfibrils or individual cellulose nanocrystals.
Figure 1B:
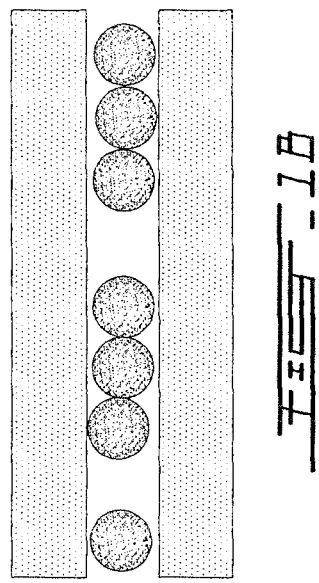
FIG. 1B is a side view of FIG. 1A

In a first aspect of the invention there is provided a water-dispersible H-NCC dried solid form having an initial moisture content of at least 4% by weight. An "initial" moisture content refers to the moisture content of the dried solid form as formed.

For convenience the invention is described hereinafter with reference to the particular embodiment in which the dried solid form is a film; but it is to be understood that the invention applies to other solid forms, as indicated hereinbefore.

Nanocrystalline cellulose suspensions produced at the pilot-plant scale, for example, contain from 95 to 98% water by weight. Drying of these suspensions to reduce bulk and mass will be necessary to facilitate transport and storage of NCC products at the industrial scale.

Nanocrystalline cellulose produced from kraft fibres and other cellulose sources contains $H^+$ counterions associated with the surface sulfate ester groups imparted to the NCC during sulfuric acid hydrolysis. Acid-form NCC (H-NCC) suspensions are not dispersible in water once they have been dried, even by gentle heat such as a vacuum oven at 35° C. for 24 h [11] or evaporation at 25° C. and ≤40% relative humidity for several months. When the proton counterion is exchanged for a monovalent cationic counterion such as $Na^+$, dried forms of NCC are completely dispersible in water [11]. However, some applications may require the use of dispersible acid-form NCC.

It has now been discovered that easily-handled solid films of H-NCC with moisture contents of about 4 to 11% (w/w) can be produced by evaporation at ambient conditions. The resulting free-standing H-NCC film is dispersible in water to yield a colloidal suspension. After brief sonication, the suspension properties are similar to those of the original suspension. Thus, by controlling the moisture content of the dried H-NCC, a lightweight, dispersible form can be produced for delivery to the consumer, who can then disperse it for use in a variety of applications. A simple drying treatment to reduce the moisture content to below 4% (w/w) will then fix the H-NCC in the desired final non-redispersible dried form. Other drying methods such as freeze-drying and spray-drying could also be used to produce solid H-NCC with moisture contents in the appropriate range to maintain the water dispersibility of the product.

It has also been discovered that freeze-dried nanocrystalline cellulose (FD NCC) is redispersible in water can be produced by counterion exchange with monovalent cations including, but not limited to sodium ions. The production involves preparing sodium-form NCC suspensions by (1): titrating acid-form NCC suspensions with sodium hydroxide to neutral or near-neutral pH, or (2): placing H-NCC suspensions on sodium-form cation exchange resin to neutral or near-neutral pH. The resulting Na-NCC suspensions are lyophilized. The freeze-dried Na-NCC disperses rapidly in de-ionized water to give a homogeneous colloidal dispersion with no visible aggregates. Such dispersions require only minimal ultrasound treatment (≤30 sec or 200 J) to produce suspensions with properties comparable to those of the original suspensions. Short drying at high (>100° C.) temperatures of Na-NCC also produces redispersible dried NCC. These methods can be used to produce lightweight, easily-stored dried NCC that is dispersible in water to give colloidal NCC suspensions.

According to the present invention, when acid-form NCC suspensions are dried by evaporation (or by other means such as freeze-drying or spray-drying) to low moisture contents in the range of 4 to 11% $H_2O$ (w/w), preferably 6 to 10% $H_2O$ (w/w), a lightweight solid form of NCC is produced that is redispersible in water to give a colloidal suspension.

Prior to the present invention, there has been no application of the inherent moisture content of dried solid H-NCC (or that of any form of cellulose) to control their dispersibility in water. It may be desirable to have a method for producing dispersible NCC without the need for counterion exchange, as the two forms possess different properties in both solid and suspension form.

Solid films which are redispersible in water to provide a colloidal suspension also be produced by freeze-drying an aqueous suspension of M-NCC, then re-dispersing the dried M-NCC in water and casting it in a film layer, when M is a monovalent cation, for example, sodium ion.

The redispersible solid films of the invention may be shipped as commercial product in their film form or in a particle form produced from the film form.

Prior to this invention, there has not been a method to produce freeze-dried NCC containing no additives that is redispersible in water.

EXAMPLES

The invention is further illustrated by reference to the following examples.

Example 1

Effect of Moisture Content on the Dispersibility of Dried NCC

Samples of H-NCC and Na-NCC suspensions were dried by evaporation at room temperature and 105° C. to moisture contents above and below 4% $H_2O$ (w/w). The dried NCC was then placed in water to test its dispersion properties. The results were as follows:

TABLE 1

Dispersion properties of dried NCC.

| Drying time @ 105° C. (min) | % $H_2O$ (w/w) | Dispersibility | |
|---|---|---|---|
| | | H-NCC | Na-NCC |
| 0 | ≥4 | Y | Y |
| 0 | <4 | N | Y |
| 2 | ~0 | N | Y |
| 120 | ~0 | (N)$^a$ | Y |

$^a$Film turned black during heating.

It has been discovered that evaporation or air dried nanocrystalline cellulose (AD NCC) containing more than ~4% $H_2O$ (w/w) is dispersible in water regardless of the nature of the counterion. At moisture contents below this threshold value it is dispersible only in the presence of sodium counterions.

Example 2

Effect of Moisture Content on the Dispersibility of Air-Dried H-NCC

H-NCC suspensions were evaporated at different temperatures to give solid films and their moisture contents determined. Their dispersion behaviour when placed in water was determined. Results were as follows:

TABLE 2

Moisture content and dispersibility of air-dried H-NCC.

| Drying T (° C.) | % $H_2O$ (w/w)$^a$ | Swelling | Dispersion | Appearance |
|---|---|---|---|---|
| 25$^b$ | 9.6-10.7 | Immediate | Y | Colloidal suspension |
| 40 | 4.4 | Immediate | Y | Colloidal suspension |
| 40 | 3.3 | Rapid | N | Solid film |
| 40 | 3.0 | Rapid | N | Solid film |
| 40 | 2.3 | Rapid | N | Solid film |
| 40 | 1.9 | Slight | N | Solid film |
| 105$^c$ | 0.6 | Slight | N | Solid film |

$^a$Based on the NCC content of the initial suspension sample used to prepare the film, calculated from the suspension mass and NCC concentration.
$^b$At ambient conditions (50-65% relative humidity).
$^c$Heated for 2 min.

Evaporating and maintaining H-NCC films in 60 to 65% relative humidity for ≥48 h produces films containing ~10% $H_2O$ (w/w), that are solid and easy to handle (being less brittle than drier films) and easily form a gel in water that disperses rapidly on its own (over 1 to 2 h to produce a uniform suspension requiring minimal sonication). There exists the potential for a new grade of dispersible dried H-NCC containing 6 to 10% $H_2O$ (w/w), with a minimum of 4% $H_2O$ (w/w). In contrast, non-dispersible, "permanent" dried H-NCC in the form of solid, brittle films, contains 0-4% $H_2O$ (w/w). These may absorb water into the film structure, which may have important implications for the barrier properties of H-NCC films. The moisture content threshold for H-NCC dispersibility that has been discovered and described in this invention means that controlling moisture content will be a key factor in product quality control.

As stated above, H-NCC is not redispersible when fully dried by evaporation [11]. However, after counterion exchange by "titration" to neutral pH with other monovalent hydroxides MOH (such as KOH, CsOH, $NH_4OH$, and $R_4NOH$ or tri-, di- or mono-alkylamine ($HR_3N$—, $H_2R_2N$— and $H_3RN$—) hydroxides) and gentle drying, air-dried M-NCC is redispersible in water to give a well-dispersed suspension with brief sonication [11]. However, no method has been reported in the literature for producing a redispersible dried NCC by lyophilization (freeze-drying). Freeze-dried Na-NCC redisperses in water to a given NCC concentration much more quickly and with less energy input by ultrasound treatment than does air-dried Na-NCC. Freeze-drying is also a more convenient and rapid method of drying large suspension volumes. Spray-drying may also be used.

According to the present invention, exchange of the $H^+$ counterion for a neutral monovalent cation ($M^+$) by means of titration with aqueous hydroxides (MOH) or by means of M+-form cation exchange resin, followed by freeze-drying of the resulting suspension, will allow the production of a freeze-dried NCC material that is redispersible in water. It has also been found that drying neutral Na-NCC suspensions at temperatures above 100° C. (e.g., 105° C.) for short periods (<2 h) produces a dispersible dried NCC product. Neutral M-NCC is also stable to desulfation and degradation during lyophilization or spray-drying and subsequent storage of the lyophilized or spray-dried product.

The degree of dispersibility of dried M-NCC depends on the extent of counterion exchange performed (that is, the proportion of original H+ counterion remaining). Generally, an acid-form NCC suspension should be reacted with MOH to reach a pH of 5 to 7, preferably 6 to 7, to ensure complete dispersibility when dried. This is equivalent to over 97% exchange of H+ to M+ counterion. Conductometric titration of the NCC suspension with sodium hydroxide may be used to establish the amount of H+ counterions remaining, if a sample containing 100% H+ counterions is used as a reference. Suspension conductivity at a given NCC concentration may also be used to compare the relative H+ and M+ contents (the conductivity $\lambda$ is given by $\lambda_{H+}=349.65\times10^{-4}$ $m^2 Smol^{-1}$ while $\lambda_{Na+}=50.08\times10^{-4}$ $m^2 Smol^{-1}$[24]).

If subjected to a thermal treatment at 80° C. for 16 h, dried NCC made from a suspension of pH 4, and therefore containing a mixture of H+ and Na+ counterions, becomes non-dispersible [8]. NCC containing ~100% Na+ counterions requires even harsher heat treatment to stabilize it against dispersion in water, for example heating at 105° C. for over 6 h.

General Procedure A: Counterion Exchange with Na+ by Addition of Aqueous NaOH to Acid-Form NCC Suspension Followed by Freeze-Drying and Redispersion in Water A known amount of acid-form NCC (1-10% (w/w)) at room temperature is placed in a beaker with a magnetic stir bar. Aqueous sodium hydroxide (0.02-2 N, preferably 0.02-0.2 N) is added slowly with stirring until the pH reaches 5-7.

The suspension is diluted if necessary to 0.01-5% NCC (w/w), frozen at −65° C. to −80° C. and freeze-dried under a vacuum of 50-100 mTorr. After freeze-drying, a product with a texture ranging from flaky lamellar to a solid foam to a soft powder was obtained.

A known quantity of solid freeze-dried sodium-form NCC (FD Na-NCC) is dispersed in enough deionized water to give a suspension 1-5% (w/w) NCC in concentration. The sample is vortexed at high speed for 1-5 minutes to ensure complete, homogeneous dispersion. A known volume of the sample (15-25 mL) is then briefly sonicated (200-5000 J/g NCC) to ensure individual NCC particles in suspension.

NCC particle sizes for H-NCC suspensions are measured by photon correlation spectroscopy prior to counterion exchange, and after redispersion of FD Na-NCC following lyophilization. Suspensions of H-NCC and redispersed FD Na-NCC are diluted in aqueous sodium chloride to give final concentrations of 1.0 to 1.5% NCC (w/w) and 10 mM NaCl and filtered with 0.45 μm Nylon Whatman (trade-mark) syringe filters. Individual redispersed freeze-dried Na-NCC particle sizes are comparable to those measured in the original suspension.

The phase separation of aqueous suspensions containing redispersed FD Na-NCC at known concentrations (1-5% NCC (w/w)) is compared to that of the original NCC suspensions at the same concentrations. Solid NCC films are formed by slow evaporation of a known volume of suspension at a known concentration (1-5% (w/w)) in plastic Petri dishes to a basis weight of 0.02-0.2 kg NCC/m² (generally 0.07 kg NCC/m²).

Figure 2:
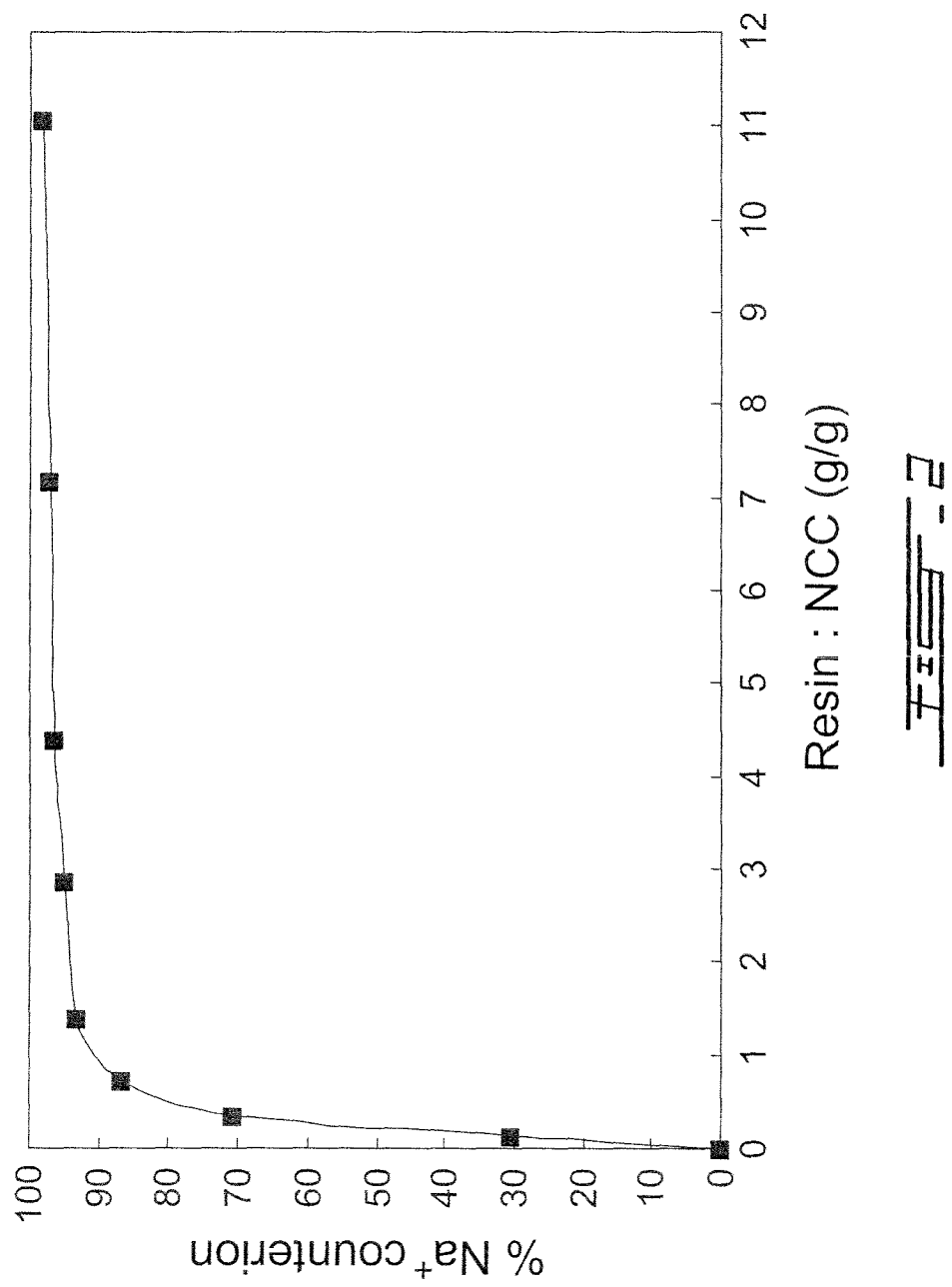
FIG. 2 shows the effect of sodium-form cation exchange resin-to-NCC ratio on the sodium counterion content of the resulting NCC suspension.

General Procedure B: Counterion Exchange with Na+ by Placing Acid-form NCC Suspension Over Sodium-form Cation Exchange Resin Followed by Freeze-drying and Redispersion in Water Sodium-form cation exchange resin is added to acid-form NCC suspension (1-5% NCC (w/w)) at ratios of 0-11 g resin to g NCC and gently stirred for about one hour. The resin is then removed by filtration. Conductometric titration with aqueous sodium hydroxide is used to quantify the residual H+ counterion content and hence the Na+ counterion content: as shown in FIG. 2, 1 g of resin per g NCC is sufficient to exchange 90% of the H+ counterions, but much larger amounts of resin are needed to approach 100% exchange.

The Na-NCC suspension is then treated as described in General Procedure A above.

Example 3

Freeze-dried Na-NCC Redispersible in Water to Give Suspensions with Properties Similar to Never-Dried Na-NCC Suspensions To a 720.5-g sample of 2.8% (w/w) H-NCC suspension is added 0.05 M NaOH with stirring at room temperature until a stable pH of 6.44 is reached. An aliquot of the 2.6% (w/w) Na-NCC suspension thus produced is frozen to −65° C. and lyophilized at 50 mTorr to obtain a flaky solid product.

The freeze-dried sodium-form NCC thus produced is completely dispersible in water: 56 mg of FD Na-NCC is dispersed in 2.5 mL water by vortexing at high speed for 1 minute.

To the homogeneous colloidal dispersion obtained above is added 2.5 mL 0.02 M NaCl (aq) to give a final concentration of ~1% (w/w) Na-NCC and 0.01 M NaCl. The sample is then sonicated (800 J at 60% amplitude) to ensure complete dispersal. Particle size is measured by PCS after filtration (0.45 μm). The sonicated redispersed FD Na-NCC has a measured particle size of 50±5 nm, comparable to the measured value for the original Na-NCC suspension of 55±2 nm at the same sonication level.

Samples of the redispersed FD Na-NCC suspension, after 250 J sonication and evaporation at ambient conditions (20-25° C., 20-60% relative humidity) to increase the NCC concentration, undergo phase separation above a critical NCC concentration of 3-3.5% NCC (w/w) at an equilibration time of less than 24 h. This is comparable to critical concentrations of 2-2.5% NCC (w/w) for the original H-NCC and Na-NCC suspensions, which also phase separated in less than 24 h.

A 15-g sample of 2.8% (w/w) redispersed FD Na-NCC suspension is sonicated to 1000 J. Slow evaporation at ambient conditions produces a solid film of basis weight 0.07 kg/m² which displays orange to green iridescence, similarly to a film of identical basis weight and sonication produced from the original Na-NCC suspension.

Example 4

Using Ion Exchange Resin to Produce Freeze-dried Na-NCC Redispersible in Water to Give Suspensions with Properties Similar to Never-Dried Na-NCC Suspensions A 50.8-g sample of 2.8% (w/w) H-NCC is placed over 15.50 g Dowex Marathon (trade-mark) C sodium-form cation exchange resin and gently stirred for 1 hour. The resin is removed by filtration with a Whatman GF/F glass microfibre filter (pore size 0.7 μm). Conductometric titration with 0.1 M NaOH is used to determine the remaining H⁺ counterion (2% of the original amount). The pH of the Na-NCC suspension is measured with a pH meter and found to be 6.2. An aliquot of the 2.8% (w/w) Na-NCC suspension is frozen to −65° C. and lyophilized at 50 mTorr to obtain a flaky solid product.

The freeze-dried sodium-form NCC thus produced redisperses rapidly in water: 10 mg of FD Na-NCC added to 5 mL deionized water completely disperses in 2 minutes with gentle shaking.

Example 5

Redispersibility of Completely Dry Na-NCC Film Produced by Evaporation with Heating A 15-mL sample of 2.58% (w/w) Na-NCC (pH=6.97) is placed in a glass Petri dish in an oven at 130±5° C. for 40 min until dry. The dish is removed from the oven and allowed to cool to room temperature in a desiccator. Upon addition of water to a portion of the dried Na-NCC film, the film swelled and lost its bluish iridescence to become grey and translucent and gel-like within 3 minutes. The gel dispersed with gentle shaking.

Example 6

Effect of pH (Relative Amounts of H⁺ and Na⁺ Counterions) on Dried NCC Dispersibility Increasing amounts of NaOH (aq) were added to an H-NCC suspension to give NCC suspensions of increasing pH ranging from 2.3 to 8. Samples of each suspension were freeze-dried (FD) or air-dried into films by evaporation (AD). To ensure complete dryness, each sample was then dried at 105° C. for 2 minutes. The dispersibility of each sample in water was then determined. The results were as follows:

TABLE 3

Effect of pH on dried NCC dispersibility.

| pH | Drying method | Dispersibility behaviour |
|---|---|---|
| 2.3 | FD | Does not disperse |
|  | AD | Does not disperse |
| 4 | FD | Partially disperses |
|  | AD | Swells; does not disperse |
| 5 | FD | Disperses |
|  | AD | Disperses (slowly) |
| 6 | FD | Disperses |
|  | AD | Disperses |
| 6.5 | FD | Disperses |
|  | AD | Disperses |
| 7 | FD | Disperses |
|  | AD | Disperses |
| 8 | FD | Disperses |
|  | AD | Disperses (more rapidly) |

References:
1. Azizi Samir, M. A. S., Alloin, F. & Dufresne, A, *Biomacromolecules* 6, 612 (2005).
2. de Souza Lima, M. M. & Borsali, R. *Macromol. Rapid Comm.* 25, 771 (2004).
3. Revol, J.-F., Bradford, H., Giasson, J., Marchessault, R. H. & Gray, D. G. *Int. J. Biol. Macromol.* 14, 170 (1992).
4. Revol, J.-F., Godbout, L., Dong, X. M., Gray, D. G., Chanzy, H. & Maret, G. *Liquid Crystals* 16, 127 (1994).
5. Marchessault, R. H., Morehead, F. F. & Koch, M. J. *J. Colloid Sci.* 16, 327 (1961).
6. Dong, X. M., Revol, J.-F. & Gray, D. G. *Cellulose* 5, 19 (1998).
7. Rånby, B. G. *Discuss. Faraday Soc.* 11, 158 (1951).
8. Revol, J.-F., Godbout, L. & Gray, D. G. 1997 Solidified liquid crystals of cellulose with optically variable properties, U.S. Pat. No. 5,629,055, May 13, to Paprican.
9. Araki, J., Wada, M., Kuga, S. & Okano, T. *Colloids Surf., A* 142, 75 (1998).
10. Araki, J., Wada, M., Kuga, S. & Okano, T. *J. Wood Sci.* 45, 258 (1999).
11. Dong, X. M. & Gray, D. G. *Langmuir* 13, 2404 (1997).
12. Viet, D., Beck-Candanedo, S. & Gray, D. G. *Cellulose* 14, 109 (2007), and references therein.
13. Heux, L., Chauve, G. & Bonini, C. *Langmuir* 16, 8210 (2000).
14. Turbak, A. F., Snyder, F. W. & Sandberg, K. R. *J. Appl. Poly. Sci.: Appl. Poly. Sympos.* 37, 815 (1983).
15. Gousse, C., Chanzy, H., Excoffier, G., Soubeyrand, L. & Fleury, E. *Polymer* 43, 2645 (2002).
16. Grunert, M, & Winter, W. T. *J. Poly. Environ.* 10, 27 (2002).
17. Araki, J., Wada, M. & Kuga, S. *Langmuir* 17, 21 (2001).
18. Samir, M. A. S. A., Alloin, F., Sanchez, J.-Y., El Kissi, N., & Dufresne, A. *Macromolecules* 37, 1386 (2004).
19. Lefebvre, J.; Gray, D. G. *Cellulose* 12, 127 (2005).
20. Edgar, C. D.; Gray, D. G. *Cellulose* 10, 299 (2003).
21. Mihranyan, A.; Llagostera, A. P.; Karmhage, R.; Strømmec, M.; Eka, R. *Int. J. Pharm.* 269, 433 (2004).
22. Kocherbitov, V.; Ulvenlund, S.; Kober, M.; Jarring, K.; Arnebrant, T. *J. Phys. Chem. B* 112, 3728, (2008).
23. Browning, B. L. *The Chemistry of Wood* New York: Wiley, 1963.
24. David R. Lide, ed., *CRC Handbook of Chemistry and Physics*, 85th ed. Boca Raton: CRC Press, 2004.

The invention claimed is:

1. A water-dispersible dried solid form H-NCC having a moisture content of at least 4% by weight.
2. A water-dispersible dried solid form according to claim 1 having a moisture content of 4 to 11% by weight.
3. A water-dispersible dried solid form according to claim 2, wherein said form is a film, powder, flake, grain, particulate or foam.
4. A water-dispersible dried solid form according to claim 2, wherein said form is a film.
5. A water-dispersible dried solid form according to claim 1 having a moisture content of 6 to 10% by weight.
6. A water-dispersible dried solid form according to claim 5, wherein said form is a film, powder, flake, grain, particulate or foam.
7. A water-dispersible dried solid form according to claim 5, wherein said form is a film.
8. A water-dispersible dried solid form according to claim 1, wherein said form is a film, powder, flake, grain, particulate or foam.
9. A water-dispersible dried solid form according to claim 1, wherein said form is a film.
10. A process for producing a water-dispersible H-NCC solid film comprising evaporating water from a film layer of an aqueous suspension of H-NCC to a moisture content of at least 4% by weight.
11. A process according to claim 10, wherein said evaporating is to a moisture content of 4 to 11% by weight.
12. A process according to claim 10, wherein said evaporating is to a moisture content of 6 to 10% by weight.

13. A method of casting a solid NCC film comprising:
dispersing a water-dispersible dried solid form H-NCC having a moisture content of at least 4% by weight, in an aqueous medium to form an aqueous suspension of NCC, casting a film layer of said suspension, and drying the film layer to said solid film.

14. A method according to claim 13, wherein said dried solid form has a moisture content of 4 to 11% by weight.

15. A method according to claim 13, wherein said dried solid form has a moisture content of 6 to 10% by weight.

* * * * *